US009990297B2

(12) United States Patent
Okawara et al.

(10) Patent No.: US 9,990,297 B2
(45) Date of Patent: Jun. 5, 2018

(54) PROCESSOR AND CONTROL METHOD OF PROCESSOR

(71) Applicant: FUJITSU LIMITED, Kawasaki-shi, Kanagawa (JP)

(72) Inventors: Hideki Okawara, Kawasaki (JP); Masatoshi Haraguchi, Fuji (JP)

(73) Assignee: FUJITSU LIMITED, Kawaksaki (JP)

( * ) Notice: Subject to any disclaimer, the term of this patent is extended or adjusted under 35 U.S.C. 154(b) by 34 days.

(21) Appl. No.: 15/222,999

(22) Filed: Jul. 29, 2016

(65) Prior Publication Data

US 2017/0060751 A1 Mar. 2, 2017

(30) Foreign Application Priority Data

Aug. 24, 2015 (JP) .................................. 2015-165280

(51) Int. Cl.
*G06F 12/08* (2016.01)
*G06F 12/0862* (2016.01)
*G06F 12/0897* (2016.01)
*G06F 12/0884* (2016.01)
*G06F 12/0875* (2016.01)

(52) U.S. Cl.
CPC ...... *G06F 12/0862* (2013.01); *G06F 12/0875* (2013.01); *G06F 12/0884* (2013.01); *G06F 12/0897* (2013.01); *G06F 2212/1021* (2013.01); *G06F 2212/452* (2013.01); *G06F 2212/6024* (2013.01)

(58) Field of Classification Search
CPC ........... G06F 12/0875; G06F 2212/452; G06F 2212/1021; G06F 12/0862; G06F 12/0884; G06F 2212/6024; G06F 12/0897

USPC ......................................................... 711/125
See application file for complete search history.

(56) References Cited

U.S. PATENT DOCUMENTS

| | | |
|---|---|---|
| 6,578,130 B2 | 6/2003 | Barrick et al. |
| 6,915,415 B2 | 7/2005 | Mayfield et al. |
| 7,318,125 B2 | 1/2008 | Chiang et al. |
| 7,533,242 B1 | 5/2009 | Moll et al. |

(Continued)

FOREIGN PATENT DOCUMENTS

EP          2204741 A1     7/2010

*Primary Examiner* — Jasmine Song
(74) *Attorney, Agent, or Firm* — Fujitsu Patent Center

(57) ABSTRACT

A processor includes an instruction executing unit which executes a memory access instruction, a cache memory unit disposed between a main memory which stores data related to the memory access instruction and the instruction executing unit, a control information retaining unit which retains control information related to a prefetch issued to the cache memory unit, an address information retaining unit which retains address information based on the memory access instruction executed in the past, and a control unit which generates and issues a hardware prefetch request. The control unit compares address information retained in the address information retaining unit and an access address in the memory access instruction executed, and generates and issues based on a comparison result a hardware prefetch request to the cache memory unit according to the control information of the control information retaining unit specified by specifying information added to the memory access instruction.

19 Claims, 7 Drawing Sheets

(56) References Cited

U.S. PATENT DOCUMENTS

| | | | |
|---|---|---|---|
| 8,166,250 B2 * | 4/2012 | Okawara | G06F 9/3455 711/133 |
| 2004/0225758 A1 * | 11/2004 | Moyer | G06F 12/0862 710/22 |

* cited by examiner

FIG. 2
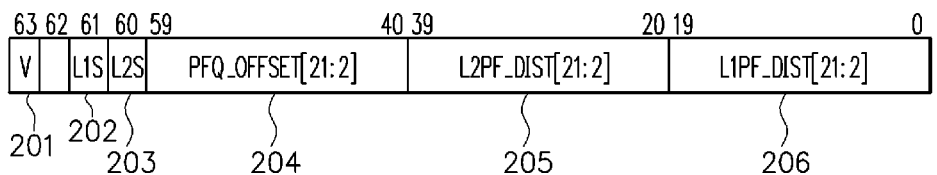
FIG. 3
FIG. 4A
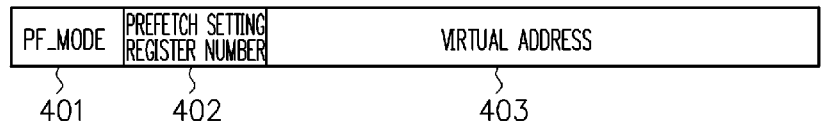
FIG. 4B
```
reg = &A[i]
reg &= 0x03ffffff
reg |= 0x80000000
load s, [reg]
```
FIG. 5
| PF_MODE | MEANING |
|---|---|
| 00 | HEADWARE PREFETCH BY SEQUENTIAL ACCESS |
| 01 | INHIBITION OF HARDWARE PREFETCH |
| 10 | HEADWARE PREFETCH BASED ON PREFETCH SETTING REGISTER (PFQ REGISTRATION MODE) |
| 11 | HEADWARE PREFETCH BASED ON PREFETCH SETTING REGISTER (PFQ NON-REGISTRATION MODE) |
FIG. 6
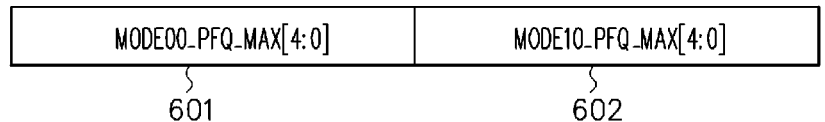

F I G. 10A
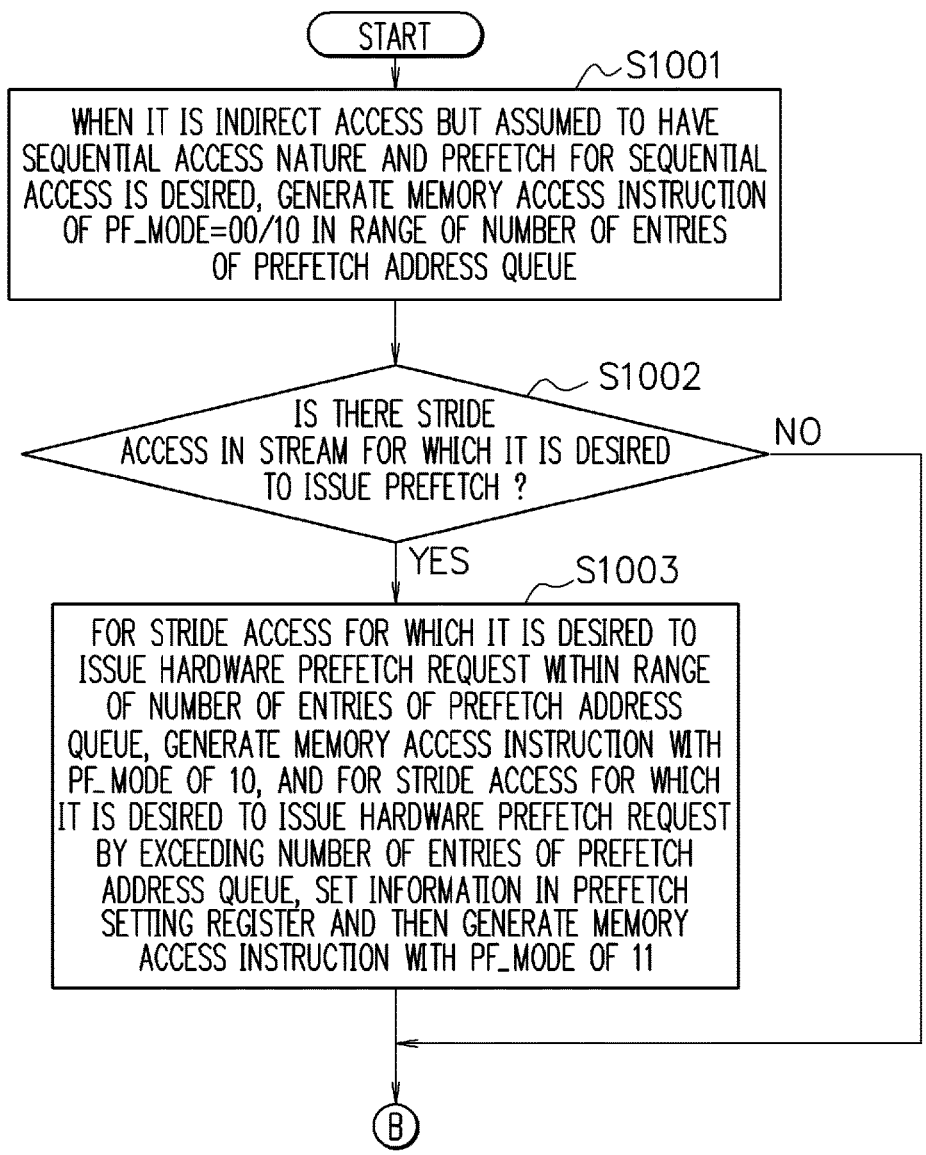

PROCESSOR AND CONTROL METHOD OF PROCESSOR

CROSS-REFERENCE TO RELATED APPLICATION

This application is based upon and claims the benefit of priority of the prior Japanese Patent Application No. 2015-165280, filed on Aug. 24, 2015, the entire contents of which are incorporated herein by reference.

FIELD

The embodiments discussed herein are directed to a processor and a control method of a processor.

BACKGROUND

A computer has multi-level hierarchical cache memories between a central processing unit (CPU) core and a main memory. It is tried to improve concealment of access latency and throughput insufficiency with respect to a lower-level cache memory closer to the main memory side among the multi-level hierarchical cache memories. Increasing the speed of a core and development of multi-cores in a CPU are in progress, and hit-rate improvement and concealment of cache-miss latency of the cache memory are needed.

As a solution for such problems, a prefetch is used that is to read data expected to be needed in the near future into a cache memory in advance, so as to decrease occurrence of cache miss. Methods of achieving the prefetch include a method by software (software prefetch) and a method by hardware (hardware prefetch).

The software prefetch is such that a compiler or a programmer explicitly inserts a prefetch instruction within instruction rows in advance, so as to perform the prefetch. Since the prefetch instruction is explicitly inserted within the instruction rows in advance, the conventional software prefetch is able to be controlled flexibly. However, the software prefetch has a difficulty in inserting a necessary prefetch instruction according to a dynamic behavior, such as a status of occurrence of cache hit or cache miss or an address calculation result.

Through the software prefetch, instructions for address calculation and prefetch instructions consume hardware resources related to issuance of instruction and execution of instruction. Thus, a performance overhead may occur. The software prefetch has a difficulty in inserting only one prefetch instruction at the minimum in units of cache lines for which the prefetch is performed. Thus, software prefetch has a problem of inserting a redundant prefetch instruction.

On the other hand, for the hardware prefetch, patterns of past memory access addresses and cache miss addresses are stored in hardware, regularities are extracted from past access patterns, and next access addresses are anticipated to perform the prefetch. For example, for the case of a continuous access in units of cache lines or a fixed-type stride access at a constant interval, there is a method to perform the hardware prefetch according to the access pattern thereof.

In the hardware prefetch, the more complicated the access pattern to be detected, the more complicated the algorithm involved and the higher the difficulty for achieving it become, or the more the circuit physical quantity and the power as hardware costs increase. The hardware prefetch operates according to an algorithm mounted in a hardware circuit, and thus a timing for issuing the prefetch and a prefetch distance indicating how far an address for which the prefetch is to be performed are fixed.

As an example of achieving the hardware prefetch of fixed-type stride access, there has been proposed a method of limiting the hardware prefetch to pattern detection between memory access instructions of the same program counter value, so as to reduce a difficulty in access pattern extraction. However, in order for the program counter value to be usable by the hardware prefetch control unit, a hardware cost for propagating the program counter value to the hardware prefetch control unit occurs. In a case where it is attempted to detect an access pattern for every program counter value, the number of entries of tables to be retained becomes large. Particularly when loop unrolling is performed to expand loop processing as part of software optimization, the number of series and a stride width tend to be large, and it is conceivable that the hardware prefetch cannot be generated effectively.

There has been proposed a technique to activate a hardware prefetch circuit by one software prefetch instruction specifying with instruction codes the size of a block, the number of blocks, and the stride width between blocks of a cache memory, so as to perform a plurality of prefetches (see, for example, Patent Documents 1, 2). This technique allows reducing the influence or consuming hardware resources related to instruction issuance and instruction execution by the software prefetch instruction. However, the stride width and so on are specified with the instruction codes, and consequently the instruction codes are consumed conversely.

With respect to the hardware prefetch, there have been proposed techniques to add hint information to inhibit registration in a prefetch address queue and issuance of hardware prefetch to the memory access instruction, so as to prevent generation of an unnecessary hardware prefetch (see, for example, Patent Documents 3, 4). There has been proposed a technique to allow setting, from the operating system, prohibition or authorization of prefetch based on behaviors when each application is executed (see, for example, Patent Document 5). There has been proposed a technique to specify by a prefetch hint instruction or the like an access pattern or the like to be detected by the hardware prefetch, so as to control operation of the hardware prefetch (see, for example, Patent Document 6).

[Patent Document 1] U.S. Pat. No. 6,578,130
[Patent Document 2] U.S. Pat. No. 6,915,415
[Patent Document 3] U.S. Pat. No. 3,166,250
[Patent Document 4] European Patent Application Publication No. 2204741
[Patent Document 5] U.S. Pat. No. 7,318,125
[Patent Document 6] U.S. Pat. No. 7,533,242

In a conventional hardware prefetch, a timing for issuing a prefetch and a prefetch distance are set in hardware and hence are fixed.

SUMMARY

An aspect of a processor includes an instruction executing unit which executes a memory access instruction, a cache memory unit disposed between a memory unit which stores data related to the memory access instruction and the instruction executing unit, a control information retaining unit which retains control information related to a prefetch to be issued to the cache memory unit, an address information retaining unit which retains address information based on the memory access instruction executed in the past, and a control unit which generates and issues a hardware prefetch request. The control unit compares address information retained in the address information retaining unit and an access address in the memory access instruction executed, and generates and issues based on a comparison result a hardware prefetch request to the cache memory unit according to the control information of the control information retaining unit specified by specifying information added to the memory access instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a prefetch setting register in the first embodiment;

FIG. 3, FIG. 4A, and FIG. 4B are diagrams for explaining examples of adding prefetch specifying information in the first embodiment;

FIG. 5 is a diagram illustrating an example of prefetch mode information in the first embodiment;

FIG. 6 is a diagram illustrating an example of a prefetch address queue operation setting register in the first embodiment;

FIG. 10A and FIG. 10B are flowcharts illustrating an example of processing for generating a memory access instruction with prefetch specifying information in this embodiment.

DESCRIPTION OF EMBODIMENTS

Hereinafter, embodiments will be explained based on drawings.

First Embodiment

A first embodiment will be explained.

Figure 1:
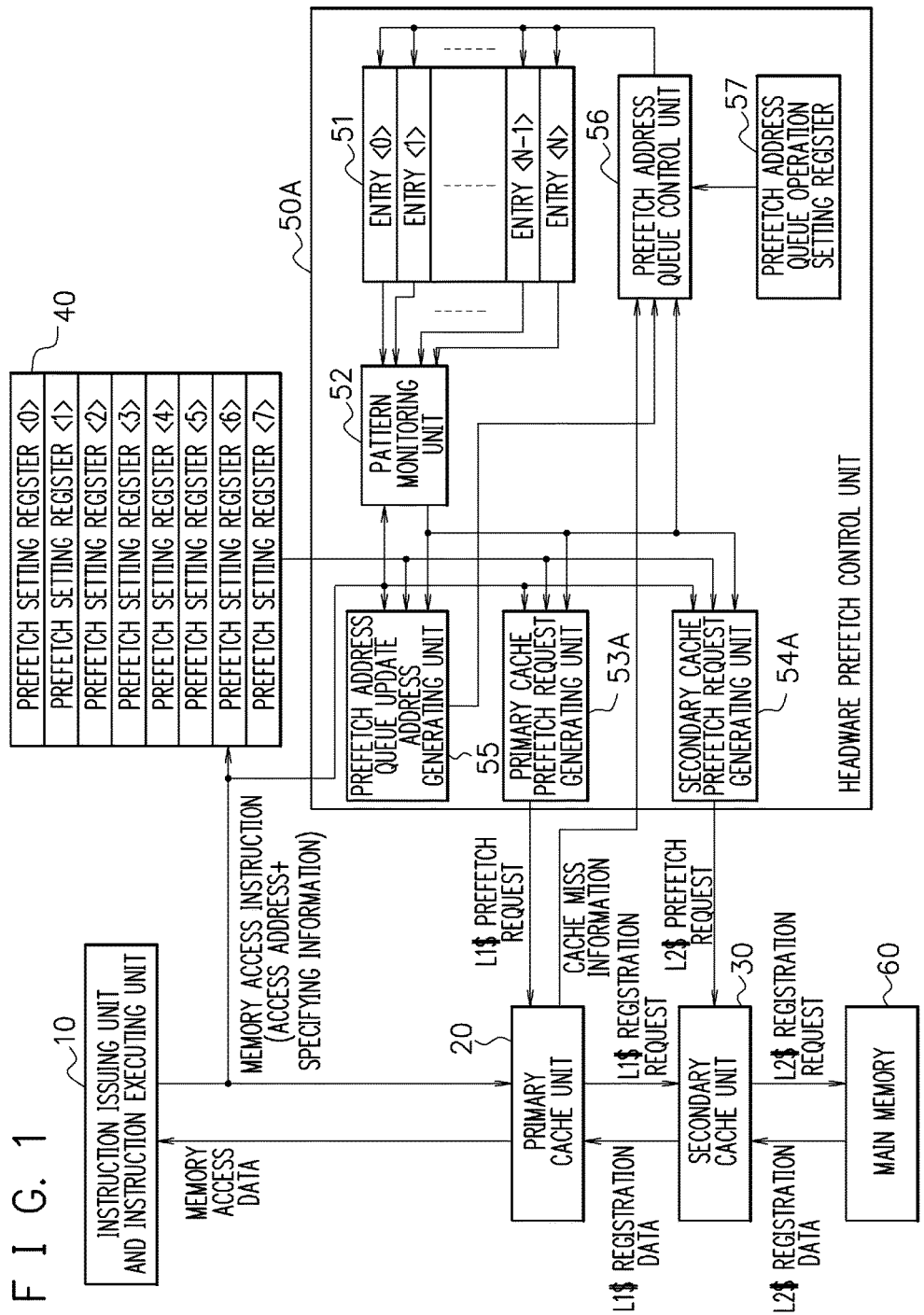
FIG. 1 is a diagram illustrating a configuration example of a processor in a first embodiment.

FIG. 1 is a block diagram illustrating a configuration example of a processor in a first embodiment. The processor in to the first embodiment includes an instruction issuing unit and an instruction executing unit 10, a primary (L1: Level-1) cache unit 20, a secondary (L2: Level-2) cache unit 30, one or more prefetch setting registers 40, and a hardware prefetch control unit 50A.

The instruction issuing unit and the instruction executing unit 10 decodes a supplied instruction and executes a process according to the result of decoding. For example, the instruction issuing unit and the instruction executing unit 10 issues a memory access instruction to the primary cache unit 20 when an access is made to data stored in a main memory 60 according to the result of decoding of the instruction.

To the memory access instruction in this embodiment, prefetch mode information and a prefetch setting register number are added as prefetch specifying information. The prefetch mode information is information specifying an operating mode related to a hardware prefetch. The prefetch setting register number is information specifying the prefetch setting register to foe referred to. The memory access instruction with prefetch specifying information issued by the instruction issuing unit and the instruction executing unit 10 is also inputted to the prefetch setting register 40 and the hardware prefetch control unit 50A.

The primary cache unit 20 includes a primary cache memory with a higher access speed capable of responding at high speed to a request from the instruction issuing unit and the instruction execution unit 10. In a case where data corresponding to an access address exists in the primary cache memory with respect to the memory access instruction from the instruction issuing unit and the instruction executing 10, the primary cache unit 20 supplies the data as memory access data to the instruction issuing unit and the instruction executing unit 10. On the other hand, in a case where the data corresponding to the access address does not exist in the primary cache memory, the primary cache unit 20 issues to the secondary cache unit 30 a primary cache registration request for requesting the data.

The secondary cache unit 30 includes a secondary cache memory having a larger capacity than the primary cache memory and having a higher access speed than the main memory 60. In a case where the data corresponding to the access address requested by the primary cache unit 20 exists in the secondary cache memory, the secondary cache unit 30 supplies the data as primary cache registration data to the primary cache unit 20. The data supplied to the primary cache unit 20 as the primary cache registration data is stored in the primary cache unit 20 and is also supplied to the instruction issuing unit and the instruction executing unit 10. In a case where the data corresponding to the access address requested does not exist in the secondary cache memory, the secondary cache unit 30 issues to the main memory 60 a secondary cache registration request for requesting the data.

Upon receiving the secondary cache registration request from the secondary cache unit 30, the main memory 60 supplies the data corresponding to the access address requested as secondary cache registration data to the secondary cache unit 30. The data supplied as the secondary cache registration data to the secondary cache unit 38 is stored in each of the secondary cache unit 30 and the primary cache unit 20, and is also supplied to the instruction issuing unit and the instruction executing unit 10.

The prefetch setting register 40 is a register which specifies operation of the hardware prefetch control unit 50A. In this embodiment, with the prefetch setting register 40, what hardware pre fetch is to be performed can be set. Information set to the prefetch setting register 40 indicated by the prefetch setting register number of the prefetch specifying information added to the memory access instruction is supplied to the hardware prefetch control unit 50A. The prefetch setting register 40 includes fields as illustrated in FIG. 2, and set information can be updated by software by using a setting register writing instruction.

FIG. 2 is a diagram illustrating an example of the prefetch setting register 40. A valid bit (V) 201 indicates whether information set in this prefetch setting register is valid or not. In this embodiment, the set information is valid in a case where the value of the valid bit (V) 201 is "1", and the set information is invalid in a case where the value of the valid bit (V) 201 is "0". When the value of the valid bit (V) 201 of the prefetch setting register 40 is "0", the hardware prefetch operation will not be performed in this embodiment.

A priority specifying bit (L1S) 202 indicates that the priority of a primary cache prefetch is high. The priority specifying bit (L1S) 202 is used for weighting of control, such as when the importance of the primary cache prefetch is high and is to be processed with priority. A priority specifying bit (L2S) 203 indicates that the priority of a secondary cache prefetch is high. The priority specifying bit (L2S) 203 is used for weighting of control, such as when the importance of the secondary cache prefetch is high and is to be processed with priority.

A field 204 stores a difference expectation value (PFQ_OFFSET) of an access address between a preceding memory access instruction and a succeeding memory access instruction. The difference expectation value (PFQ_OFF-SET) specifies, in order for a hardware prefetch request to be generated, how far the address where the succeeding memory access instruction has come may be from the access address of the preceding memory access instruction.

A field 205 stores a secondary cache prefetch distance (L2PF_DIST) which, when the hardware prefetch request is generated, specifies how far the address for which a secondary cache prefetch request is to be generated may be from the access address of the memory access instruction. A field 206 stores a primary cache prefetch distance (L1PF_DIST) which, when the hardware prefetch request is generated, specifies how far the address for which a primary cache prefetch request is to be generated may be from the access address of the memory access instruction.

In the example illustrated in this embodiment, the highest-order bit (the 21st bit in this example) of each of the difference expectation value (PFQ_OFFSET), the prefetch distance (L2PT_DIST), and the prefetch distance (L1PF_DIST) being set is a sign bit. Therefore, in the example illustrated in FIG. 2, each of the difference expectation value (PFQ_OFFSET), the prefetch distance (L2PF_DIST), and the prefetch distance (L1PF_DIST) can be set in the range of ±2 MB, and control of hardware prefetch is possible in either of an address ascending direction and an address descending direction. In a case where the prefetch distance (L2PF_DIST) is 0 (zero), the secondary cache prefetch request will not be generated. In a case where the prefetch distance (L1PF_DIST) is 0 (zero), the primary cache prefetch request will not foe generated.

Here, methods illustrated in FIG. 3 and FIG. 4A are examples of a method of adding prefetch specifying information to the memory access instruction. FIG. 3 illustrates an example of adding the prefetch specifying information by using part of instruction codes of the memory access instruction. In addition to areas 301, 302, 303 which respectively specify an instruction type, a base register number where a base address is stored, and an address immediate value indicating an offset with respect to the base address, areas 304, 305 are provided so as to respectively specify prefetch mode information (PF_MODE) and prefetch setting register number.

FIG. 4A illustrates an example of adding the prefetch specifying information by using non-used bits of an access address. Depending on the processor, only part of address ranges usable as an access address in the memory access instruction may be used. In a case where such a non-used address range exists, it is possible to add the prefetch specifying information by using non-used bits. For example, as illustrated in FIG. 4A, in a case where only an area 403 on the lower side is used in the memory access instruction, areas 401, 402 are provided on the upper side to respectively specify the prefetch mode information (PF_MODE) and the prefetch setting register number.

For example, by executing a program as illustrated in FIG. 4B, it is possible to set the prefetch mode information (PF_MODE) and the prefetch setting register number. Note that FIG. 4B illustrates an example in which the prefetch mode information (PF_MODE) sets a two-bit value "10", and the prefetch setting register number sets a four-bit value "0000".

First, an access address of an array A is obtained. Then, a logical product with a value "0x03ffffff" is taken to clear values of higher-order 6 bits specifying the prefetch mode information (PF_MODE) and the prefetch setting register number to 0 (zero). Thereafter, a logical sum with a value "0x80000000" is taken to specify the prefetch mode information (PF_MODE) and the prefetch setting register number. Thereafter, when the memory access instruction is executed, an address in which prefetch specifying information (the prefetch mode information (PF_MODE) and the prefetch setting register number) are embedded is loaded.

FIG. 5 illustrates an example of operating modes related to the hardware prefetch specified by the prefetch mode information (PF_MODE). In this embodiment, for example, the PF_MODE of 00 indicates an operating mode of the hardware prefetch by an ordinary sequential access, and the PF_MODE of 01 indicates inhibiting operation of the hardware prefetch. Mote that in the operating mode of the hardware prefetch by the ordinary sequential access, the hardware prefetch request is generated according to hardware setting without using the prefetch setting register.

Further, the PF_MODE of 10 indicates an operating mode (PFQ registration mode) of hardware prefetch based on a specification of the prefetch setting register including registering in a prefetch address queue, and the PF_MODE of 11 indicates an operating mode (PFQ non-registration mode) of hardware prefetch based on a specification of the prefetch setting register not performing registering in the prefetch address queue. In the PFQ registration mode being PF_MODE of 10, after registering in the prefetch address queue is performed at the opportunity of a cache miss, the hardware prefetch request is generated in the succeeding memory access instruction. Thus, the PFQ registration mode has a merit that the hardware prefetch request is not generated in the cases where cache hits continue, but meanwhile it is not possible to operate exceeding the number of resources of the prefetch address queue. On the other hand, in the PFQ non-registration mode being PF_MODE of 11, the hardware prefetch request is generated simultaneously as execution of the memory access instruction. Thus, in the PFQ non-registration mode, although the hardware prefetch request is generated even when it is a cache hit, the prefetch request can be generated irrespective of the number of resources of the prefetch address queue.

Referring back to FIG. 1, the hardware prefetch control unit 50A includes a prefetch address queue 51, a pattern monitoring unit 52, a primary cache prefetch request generating unit 53A, a secondary cache prefetch request generating unit 54A, a prefetch address queue update address generating unit 55, a prefetch address queue control unit 56, and a prefetch address queue operation setting register 57. The hardware prefetch control unit 50A controls generation and issuance of the hardware prefetch request based on the memory access instruction with the prefetch specifying information and a specification of the prefetch setting register 40, or the like.

The prefetch address queue 51 retains one or more address information (address patterns) based on the access address of a memory access instruction executed in the past. In the example illustrated in FIG. 1, the prefetch address queue 51 has (N+1) entries from entry <0> to entry <N>, and retains address information in each entry. Note that when there is no empty entry in the prefetch address queue 51, address information is overwritten on one entry chosen according to least recently used (LRU) control, or the like.

In the operating mode (PF_MODE=00) of the hardware prefetch by an ordinary sequential access, the address which is located away by an address (for example, a cache line size), which is set in hardware, with respect to the access address is retained as address information in the prefetch address queue 51. In the operating mode (PF_MODE=10) of the hardware prefetch based on the specification of the prefetch setting register, the address which is located away by the difference expectation value (PFQ_OFFSET) with respect to the access address is retained as address information in the prefetch address queue 51.

The pattern monitoring unit 52 performs a comparison process between the access address of the memory access instruction from the instruction issuing unit and the instruction executing unit 10 and the address information (address pattern) retained in each entry of the prefetch address queue 51. The pattern monitoring unit 52 outputs the result of the comparison process to the primary cache prefetch request generating unit 53A, the secondary cache prefetch request generating unit 54A, the prefetch address queue update address generating unit 55, and the prefetch address queue control unit 56.

The primary cache prefetch request generating unit 53A generates the primary cache prefetch request according to the result of the comparison process outputted from the pattern monitoring unit 52, and the like, and issues the primary cache prefetch request to the primary cache unit 20. The secondary cache prefetch request generating unit 54A generates the secondary cache prefetch request according to the result of the comparison process outputted from the pattern monitoring unit 52, and the like, and issues the secondary cache prefetch request to the secondary cache unit 30. The prefetch address queue update address generating unit 55 generates address information based on the access address of the memory access instruction according to the result of the comparison process outputted from the pattern monitoring unit 52, and the like, and outputs the address information to the prefetch address queue control unit 56.

The prefetch address queue control unit 56 makes the prefetch address queue 51 retain the address information (address pattern) generated in the prefetch address queue update address generating unit 55 according to the result of the comparison process outputted from the pattern monitoring unit 52 and the cache miss information from the primary cache unit 20. The prefetch address queue control unit 56 refers to the prefetch address queue operation setting register 57 and chooses an entry of the prefetch address queue 51 according to the LRU control or the like, and makes the address information (address pattern) be retained in the entry.

The prefetch address queue operation setting register 57 is a register which sets how many entries the prefetch, address queue 51 can be used at most in each operating mode in a case where the prefetch address queue 51 is shared among a plurality of operating modes for performing registration of address information. The prefetch address queue operation setting register 57 has fields as illustrated in FIG. 6, in which information can be set by software.

FIG. 6 is a diagram illustrating an example of the prefetch address queue operation setting register 57. In the example illustrated in FIG. 6, in a field 601, the largest number of entries (MODE00_PFQ_MAX) usable in the operating mode (PF_MODE=00) of the hardware prefetch of the ordinary sequential access is set. In a field 602, the largest number of entries (MODE10_PFQ_MAX) usable in the operating mode (PFQ registration mode) (PF_MODE=10) of the hardware prefetch based on the specification of the prefetch setting register is set. In the example illustrated in FIG. 6, the fields 601, 602 are of 5 bits, allowing specifying the largest number of usable entries in the range of 0 to 31.

For example, when the prefetch address queue 51 has 16 entries and values set in the fields 601, 602 are both 8, it is divided by 8 entries to be used. Besides, for example, when the prefetch address queue 51 has 16 entries and values set in the fields 601, 602 are both 16, 16 entries may be used in either operating mode, and the prefetch address queue 51 operates in a state of being completely shared by the two operating modes.

Figure 7:
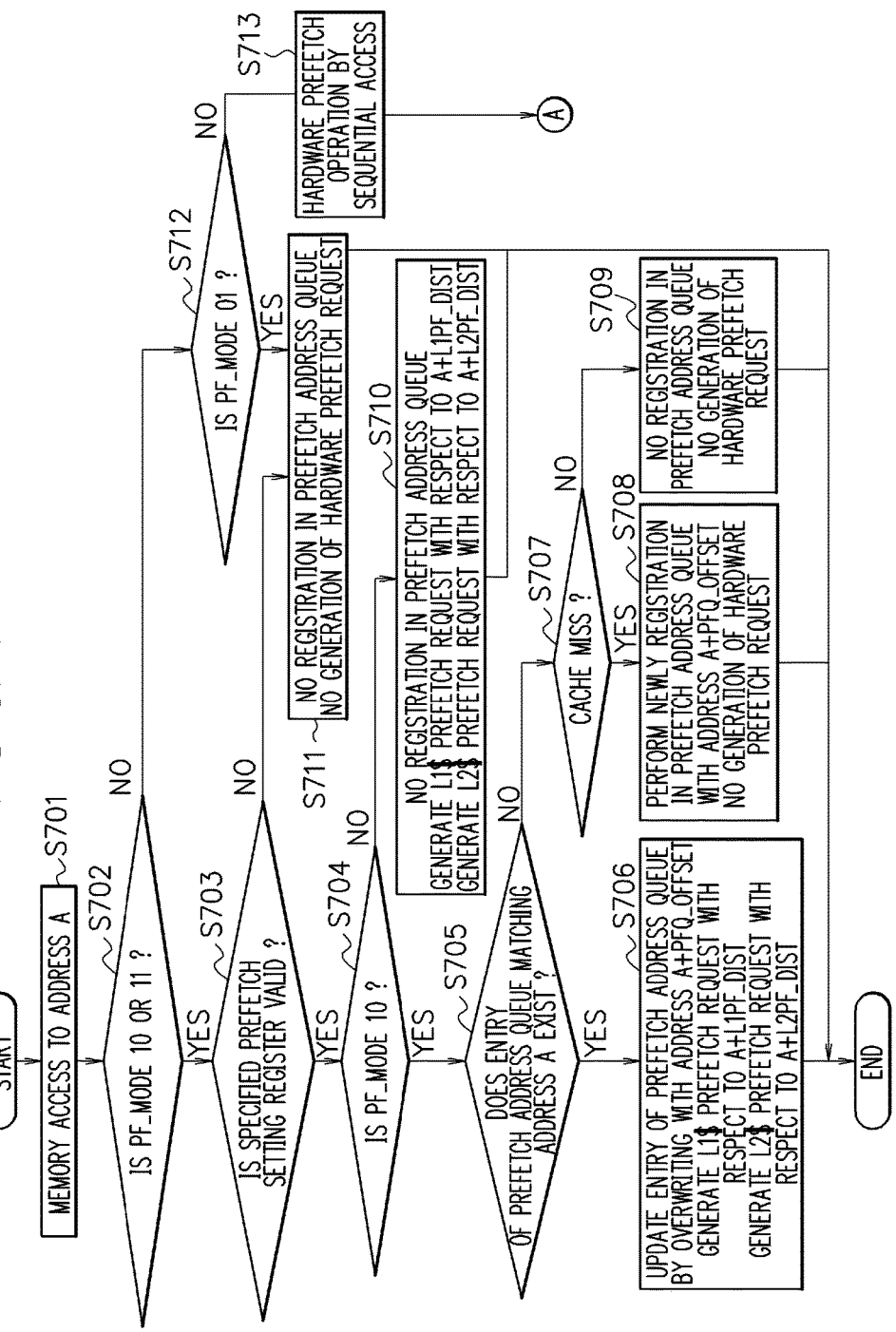
FIG. 7 and FIG. 8 are flowcharts illustrating a process operation example of a hardware prefetch control unit in the first embodiment.
Figure 8:
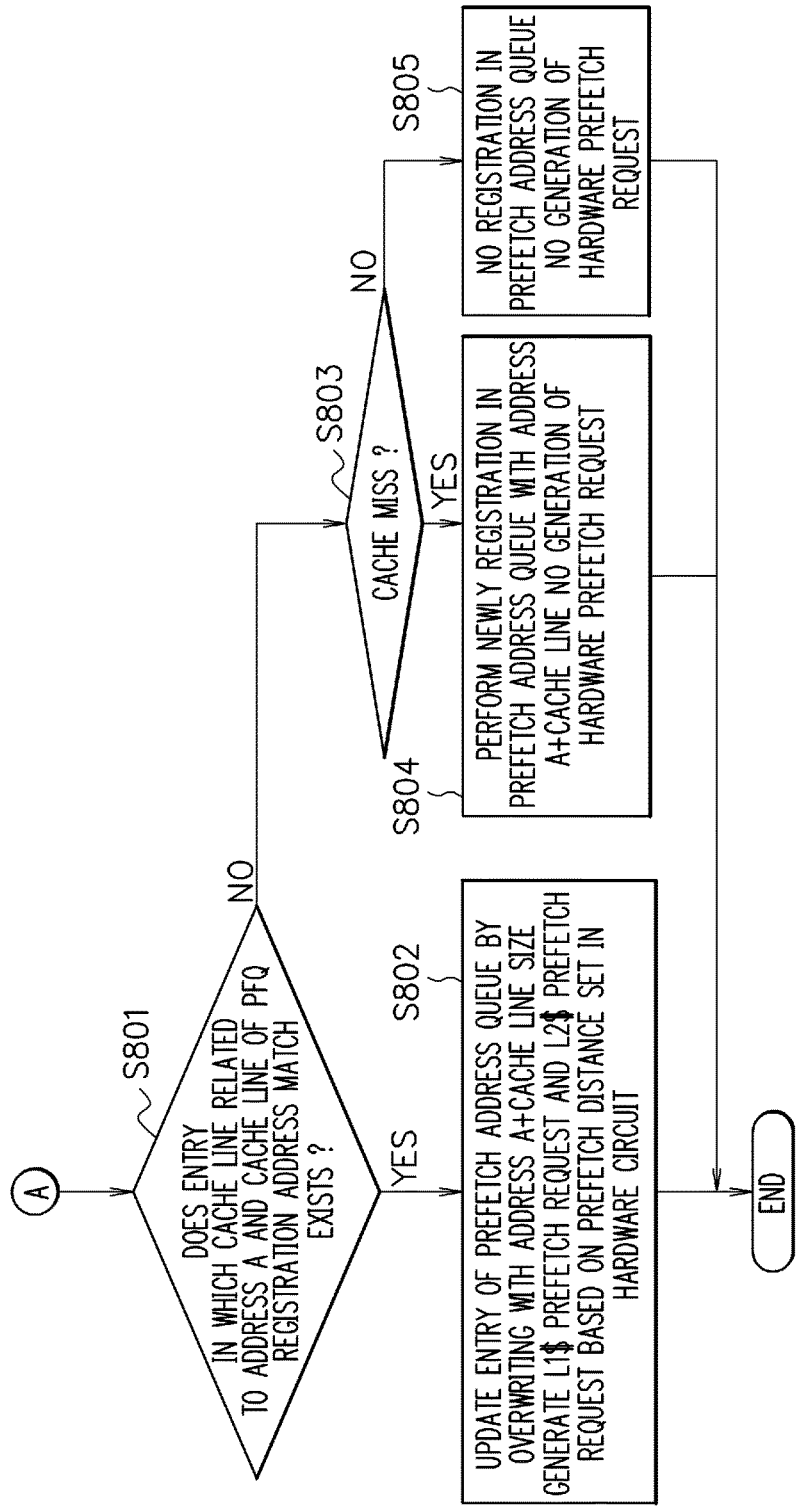

Next, operation of the hardware prefetch control unit 50A in this embodiment will be explained. FIG. 7 and FIG. 8 are flowcharts illustrating a process operation example of the hardware prefetch control unit 50A. An example of the case where a memory access instruction with respect to an access address A is issued by the instruction issuing unit and the instruction executing unit 10 will be explained below.

Upon input of the memory access instruction with respect to the access address A issued by the instruction issuing unit and the instruction executing unit 10 in step S701, the hardware prefetch control unit 50A judges in step S702 whether or not the prefetch mode information (PF_MODE) of the prefetch specifying information added is "10" or "11". That is, the hardware prefetch control unit 50A judges whether the operating mode indicated by the prefetch mode information is the operating mode of the hardware prefetch based on the specification of the prefetch setting register.

When it is judged that the prefetch mode information (PF_MODE) of the prefetch specifying information is "10" or "11", that is, it is the operating mode of the hardware prefetch based on the specification of the prefetch setting register (YES in step S702), the process proceeds to step S703. In step S703, the hardware prefetch control unit 50A judges whether the prefetch setting register 40 specified in the prefetch setting register number of the prefetch specifying information is valid or not.

When it is judged that the specified prefetch setting register 40 is valid (YES in step S703), in step S704, the hardware prefetch control unit 50A judges whether the prefetch mode information (PF_MODE) is "10" or not. That is, the hardware prefetch control unit 50A judges whether the operating mode indicated by the prefetch mode information is the operating mode (PFQ registration mode) of the hardware prefetch based on the specification of the prefetch setting register including the registration process in the prefetch address queue.

When it is judged that the prefetch mode information (PF_MODE) of the prefetch specifying information is "10", that is, it is the operating mode (PFQ registration mode) of the hardware prefetch based on the specification of the prefetch setting register (YES in step S704), the process proceeds to step S705. In step S705, the hardware prefetch control unit 50A judges by the pattern monitoring unit 52 whether an entry which retains address information matching the access address A exists in the prefetch address queue 51.

When it is judged that the entry which retains address information matching the access address A exists in the prefetch address queue 51 (YES in step S705), the process proceeds to step S706. In step S706, the hardware prefetch control unit 50A updates the address information retained by this entry by overwriting. At this time, the hardware pt re fetch control unit 50A calculates in the prefetch address queue update address generating unit 55 an address (A+PFQ_OFFSET) by using the difference expectation value (PFQ_OFFSET) set in the specified prefetch setting register 40, and makes the address obtained by calculating be retained as new address information.

Further, in step S706, the hardware prefetch control unit 50A lets the primary cache prefetch request generating unit 53A and the secondary cache prefetch request generating unit 54A generate and issue the hardware prefetch request based on the specification of the prefetch setting register 40. The primary cache prefetch request generating unit 53A generates the primary cache prefetch request with respect to the address (A+L1PF_DIST) located away from the access address A by the set prefetch distance (L1PF_DIST). The secondary cache prefetch request generating unit 54A generates the secondary cache prefetch request with respect to the address (A+L2PF_DIST) located away from the access address A by the set prefetch distance (L2PF_DIST). Thereafter, the process is finished.

In step S705, when it is judged that the entry which retains the address information matching the access address A does not exist in the prefetch address queue 51 (NO in step S705), the process proceeds to step S707. In step S707, the hardware prefetch control unit 50A judges whether the memory access instruction with respect to the access address A is a cache miss or not.

When it is judged that the memory access instruction with respect to the access address A is a cache miss (YES in step S707), the process proceeds to step S708. In step S708, the hardware prefetch control unit 50A uses the difference expectation value (PFQ_OFFSET) set in the specified prefetch setting register 40 to calculate the address (A+PFQ_OFFSET) in the prefetch address queue update address generating unit 55, and newly registers the address (A+PFQ_OFFSET) in an entry of the prefetch address queue 51. When the process proceeds to step S708, only the new registration of the address information in the prefetch address queue 51 is performed, and the process is finished without performing generation of the hardware prefetch request.

In step S707, when it is judged that the memory access instruction with respect to the access address A is not a cache miss, that is, it is a cache hit (NO in step S707), the process proceeds to step S709, and the process is finished without performing both the registration of the address information in the prefetch address queue 51 and the generation of the hardware prefetch request.

When it is judged in step S704 that the prefetch mode information (PF_MODE) of the prefetch specifying information is not "10", that is, the prefetch mode information is "11" (NO in step S704), the process proceeds to step S710. That is, when it is judged in step S704 that the operating mode indicated by the prefetch mode information is the operating mode (PFQ non-registration mode) of the hardware prefetch based on the specification of the prefetch setting register, the process proceeds to step S710.

In step S710, the hardware prefetch control unit 50A, without performing the registration of the address information in the prefetch address queue 51, lets the primary cache prefetch request generating unit 53A and the secondary cache prefetch request generating unit 54A generate and issue the hardware prefetch request based on the specification of the prefetch setting register 40. The primary cache prefetch request generating unit 53A generates the primary cache prefetch request with respect to the address (A+L1PF_DIST) located away from the access address A by the set prefetch distance (L1PF_DIST). The secondary cache prefetch request generating unit 54A generates the secondary cache prefetch request with respect to the address (A+L2PF_DIST) located away from the access address A by the set prefetch distance (L2PF_DIST). Thereafter the process is finished.

When it is judged in step S703 that the prefetch setting register 40 specified by the prefetch setting register number of the prefetch specifying information is not valid (NO in step S703), the process proceeds to step S711, and the process is finished without performing both the registration of the address information in the prefetch address queue 51 and the generation of the hardware prefetch request.

When it is judged in step S702 that the prefetch mode information (PF_MODE) of the prefetch specifying information is neither "10" nor "11" (NO in step S702), the process proceeds to step S712. In step S712, the hardware prefetch control unit 50A judges whether the prefetch mode information (PF_MODE) of the prefetch specifying information is "01" or not. That is, the hardware prefetch control unit 50A judges whether the operating mode indicated by the prefetch mode information is inhibition of the hardware prefetch or not.

When it is judged that the prefetch mode information (PF_MODE) of the prefetch specifying information is "01", that is, it is the inhibition of the hardware prefetch (YES in step S712), the process proceeds to step S711, and the process is finished without performing both the registration of the address information in the prefetch address queue 51 and the generation of the hardware prefetch request.

On the other hand, when it is judged that the prefetch mode information (PF_MODE) of the prefetch specifying information is not "01", that is, the prefetch mode information is "00" (NO in step S712), the process proceeds to step S713. Specifically, when it is judged in step S712 that the operating mode indicated by the prefetch mode information is the operating mode of the hardware prefetch by the ordinary sequential access, the process proceeds to step S713.

In step S713, the hardware prefetch control unit 50A starts operation of the hardware prefetch by ordinary sequential access, and proceeds to step S801 illustrated in FIG. 8. In step S801, the hardware prefetch control unit 50A judges by the pattern monitoring unit 52 whether an entry which retains address information with a cache line matching a cache line related to the access address A exists in the prefetch address queue 51.

When it is judged that the entry which retains address information with a cache line matching a cache line related to the access address A exists in the prefetch address queue 51 (YES in step S801), the process proceeds to step S802. In step S802, the hardware prefetch control unit 50A updates the address information retained by this entry by overwriting. At this time, the hardware prefetch control unit 50A calculates the address of (A+cache line size) in the prefetch address queue update address generating unit 55, and makes the address of (A+cache line size) be retained as new address information.

Further, in step S802, the hardware prefetch control unit 50A lets the primary cache prefetch request generating unit 53A and the secondary cache prefetch request generating unit 54A generate and issue the hardware prefetch request based on a prefetch distance set by a hardware circuit. The primary cache prefetch request generating unit 53A generates the primary cache prefetch request with respect to the address located away from the access address A by the set prefetch distance. The secondary cache prefetch request generating unit 54A generates the secondary cache prefetch request with respect to the address located away from the access address A by the set prefetch distance. Thereafter, the process is finished.

In step S801, when it is judged that the entry which retains the address information with a cache line matching a cache line related to the access address A does not exist in the prefetch address queue 51 (NO in step S801), the process proceeds to step S803. In step S803, the hardware prefetch control unit 50A judges whether the memory access instruction with respect to the access address A is a cache miss or not.

When it is judged that the memory access instruction with respect to the access address A is a cache miss (YES in seep S803), the process proceeds to step S804. In step S804, the hardware prefetch control unit 50A calculates the address of (A+cache line size) in the prefetch address queue update address generating unit 55, and newly registers the address of (A+cache line size) in an entry of the prefetch address queue 51. When the process proceeds to step S804, only the new registration of the address information in the prefetch address queue 51 is performed, and the process is finished without performing generation of the hardware prefetch request.

In step S803, when it is judged that the memory access instruction with respect to the access address A is not a cache miss, that is, it is a cache hit (NO in step S803), the process proceeds to step S805, and the process is finished without performing both the registration of the address information in the prefetch address queue 51 and the generation of the hardware prefetch request.

According to the first embodiment, a plurality of prefetch setting registers which control operation of the hardware prefetch are provided, and the prefetch setting register number is specified by the prefetch specifying information added to the memory access instruction, thereby enabling to control the hardware prefetch operation by software. In a case where a different prefetch setting register is specified to every memory access instruction, an optimum hardware prefetch request corresponding to characteristics of data can be generated.

In this embodiment, the expectation value of the difference in access address between the preceding memory access instruction and the succeeding memory access instruction can be set in the prefetch setting register. The hardware prefetch request can be generated and issued with respect not only to the sequential access but to an optional stride access. As compared to monitoring an address difference and performing access pattern extraction by conventional hardware, since the expectation value of the succeeding access address is uniquely set, the detection circuit for access pattern does not become complicated, allowing mounting of hardware which is efficient in circuits and electrical power.

In this embodiment, it is possible to set in the prefetch setting register how far ahead the prefetch distance of an address to which the hardware prefetch request is to be generated and issued, with respect to the memory address by the succeeding memory access instruction. Thus, flexible adjustment of prefetch distance is possible by software, while the prefetch request is generated with a fixed prefetch distance in the conventional hardware prefetch. For example, in a case where it is desired to generate a hardware prefetch request with a different prefetch distance in spite of the same access pattern, this can be achieved by selectively using the prefetch setting register which is specified in the memory access instruction.

Thus, in this embodiment, a plurality of prefetch setting registers and a plurality of operating modes of the hardware prefetch, which are added to the memory access instruction and can be specified by software, are selectively used for every memory access instruction. This enables generation of the hardware prefetch request while flexibly controlling by software the method of use of the access pattern, the prefetch distance, and the prefetch address queue of the hardware prefetch. Collaborative operation of hardware and software leads to high performance improvement effect, and the physical amount of circuits and power consumption of hardware can also be reduced. Further, by giving a software specification accompanying the memory access instruction, the hardware prefetch control unit can perform address calculation and generation and issuance of the prefetch request along with execution of the memory access instruction, without causing a problem such as an increase in number of instructions, or an insertion of a redundant prefetch, which have been problems when a software prefetch instruction is inserted. Specifying the prefetch setting register number allows the bit number of the field necessary for instruction codes to be small, and allows widening the address difference expectation value and the range of the prefetch distance depending on the definition of the prefetch setting register.

Second Embodiment

Next, a second embodiment will be explained.

Figure 9:
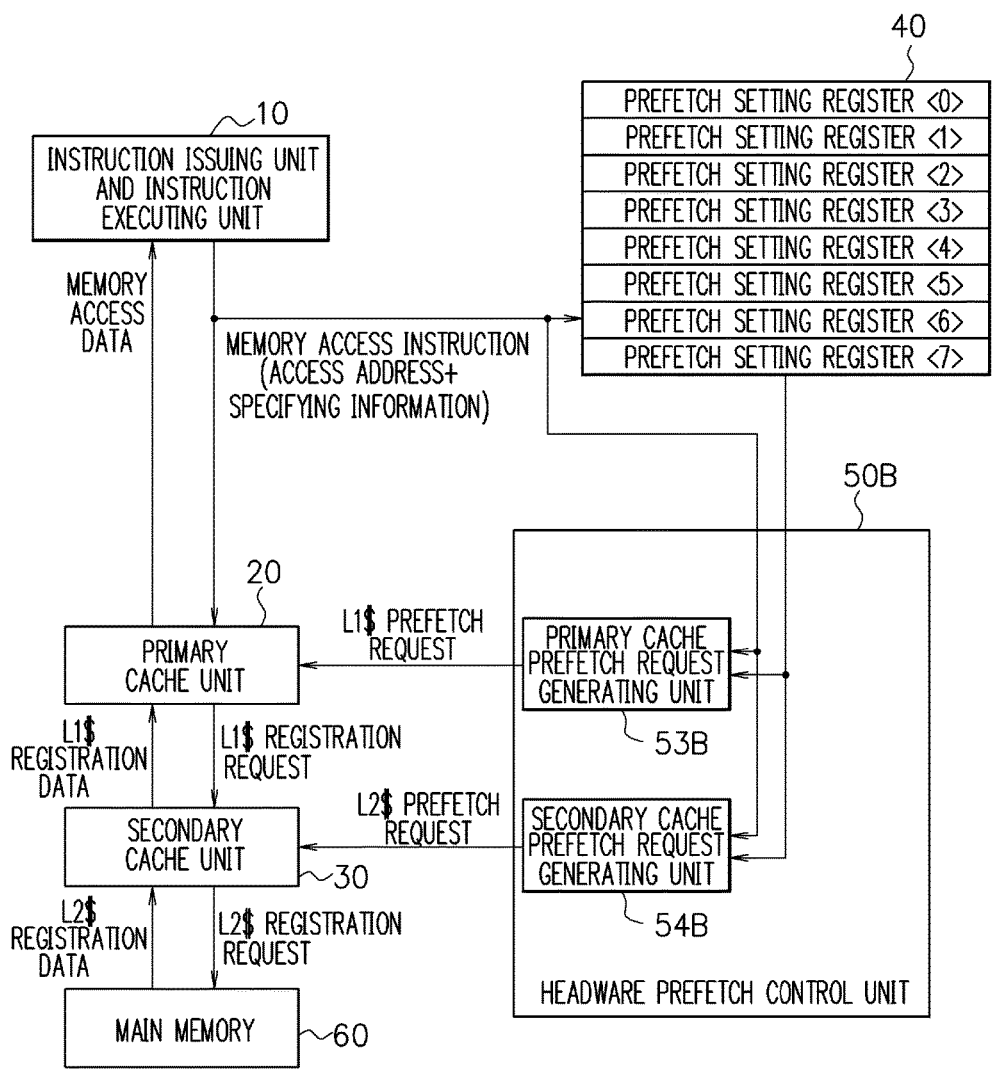
FIG. 9 is a diagram illustrating a configuration example of a processor in as second embodiment.

FIG. 9 is a block diagram illustrating a configuration example of the processor in the second embodiment. In FIG. 9, any components having the same functions as the components illustrated in FIG. 1 are given the same reference numerals, and duplicated explanations are omitted. The processor in the second embodiment includes an instruction issuing unit and the instruction executing unit 10, a primary cache unit 20, a secondary cache unit 30, one or more prefetch setting registers 40, and a hardware prefetch control unit 50B as illustrated in FIG. 9.

The processor in the second embodiment differs in the hardware prefetch control unit 50B from the hardware prefetch control unit 50A which the processor in the first embodiment includes. The hardware prefetch control unit 50B includes a primary cache prefetch request generating unit 53B and a secondary cache prefetch request generating unit 54B.

In the second embodiment, the primary cache prefetch request generating unit 53B generates a primary cache prefetch request based on a specification of the prefetch setting register 40, and issues the primary cache prefetch request to the primary cache unit 20. The secondary cache prefetch request generating unit 54B generates a secondary cache prefetch request based on a specification of the prefetch setting register 40, and issues the secondary cache prefetch request to the secondary cache unit 30. In this embodiment, the prefetch address queue is not provided, and issuance of the hardware prefetch request is possible simultaneously as a memory access instruction.

Without including the prefetch address queue which retains address information of memory access instructions executed in the past, this configuration allows performing, simultaneously as the memory access instruction, address calculation according to setting in the prefetch setting register and generating a hardware prefetch request. Accordingly, it is possible to mounting a processor whose physical amount of hardware is reduced by not mounting the prefetch address queue itself.

Figure 10B:
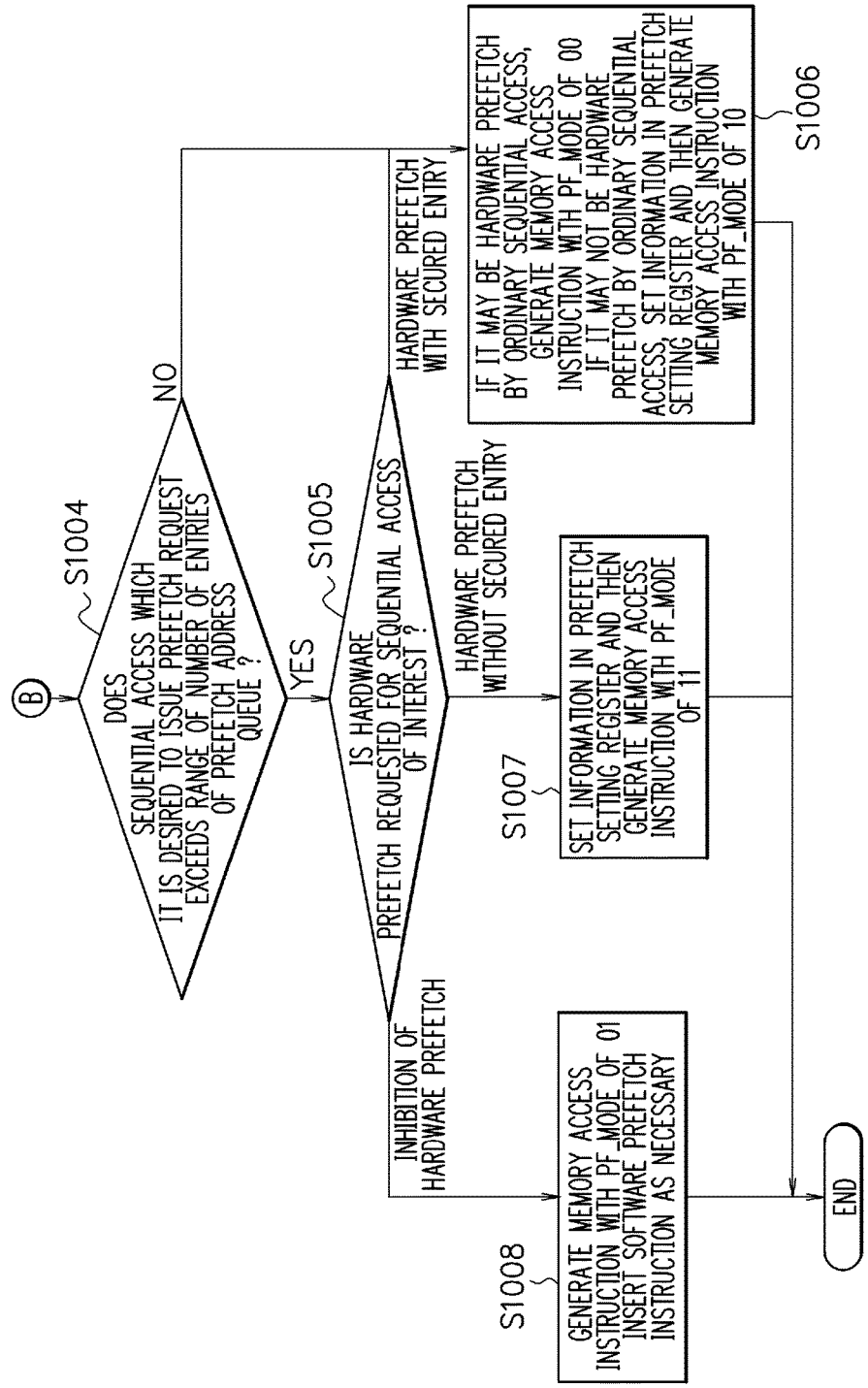

FIG. 10A and FIG. 10B are flowcharts illustrating an example of processing for generating a memory access instruction with prefetch specifying information in one embodiment. FIG. 10A and FIG. 10B illustrate examples of flowcharts in a case where a memory access instruction instructing generation of hardware prefetch is generated by software in consideration of increase in number of instructions for generation of software prefetch.

Examples of access patterns of a typical memory access instruction as a software program include an indirect access, a stride access, and a sequential access. In view of a prefetch operating by cache line, it is the stride access with a smaller stride width than a cache line sire that is the range supportable at most by a conventional hardware prefetch by sequential access.

In the indirect access, the access address is determined with reference to a different variable, and hence there are both the case where it is a sequential access and the case where it is a random access. When it is the indirect access and also is a sequential access or has a high possibility of being a sequential access, it is possible to detect a dynamic access pattern with the conventional hardware prefetch by sequential access, and then generate the hardware prefetch. On the other hand, when it is attempted to generate the software prefetch instruction, in the indirect access, a calculation of an address (access address+prefetch distance) to be accessed by the prefetch is necessary, and the number of instructions increases. It is also highly possible that an unnecessary software prefetch instruction is inserted, and costs for software prefetch instruction are large.

Accordingly, in the process examples illustrated in FIG. 10A and FIG. 10B, a prefetch address queue is assigned in the order of the indirect access (in the case where it is assumed as the sequential access), the stride access, and the sequential access.

First, in step S1001, when it is an indirect access but assumed to be of a sequential access pattern and a prefetch by sequential accesses is desired, the prefetch mode information (PF_MODE) of 00 or 10 is specified in the range of the number of entries which the prefetch address queue has, so as to generate a memory access instruction. In the case where there is a nature of sequential access as a consequence when viewed in its entirety but the memory access instruction which caused the sequential access is not identified, or the like, the prefetch mode information (PF_MODE) of 00 is specified, and the prefetch is performed by hardware prefetch from sequential access pattern detection by the conventional hardware prefetch by sequential access. When what memory access instruction the continuity is present in can be specified, the prefetch mode information (PF_MODE) of 10 may be specified, so as to use the prefetch setting register.

Next, in step S1002, a judgment of prefetch with respect to the stride access is made. When the stride access for which the prefetch is desired exists, in step S1003, the memory access instruction is generated with the prefetch mode information (PF_MODE) of 10 (PFQ registration mode) for the stride access for which it is desired to issue the hardware prefetch within the range of the number of entries of the prefetch address queue. Information of stride width and so on is set in the prefetch setting register. When it is desired to issue the hardware prefetch for the stride access by exceeding the number of entries of the prefetch address queue, the prefetch setting register is set, and then the memory access instruction is generated with the prefetch mode information (PF_MODE) of 11 (PFQ non-registration mode).

Finally, a plan for the sequential access is determined. In step S1004, it is judged whether the sequential access for which it is desired to issue the prefetch request is within the range of the number of entries of the prefetch address queue. As a result, if it is within the range of the number of entries of the prefetch address queue, in step S1006, the memory access instruction with the prefetch mode information (PF_MODE) being specified to 00 or 10 is generated. Further, if the number of streams of the sequential access exceeds the range of the number of entries of the prefetch address queue, in step S1005, it is judged whether the sequential access focused is to be hardware prefetched or not. Then, one of the followings is chosen: assigning the prefetch address queue with priority and the prefetch mode information (PF_MODE) of 00 or 10 is specified in step S1006, or specifying the prefetch mode information (PF_MODE) of 11 without using the prefetch address queue in step S1007, or specifying the prefetch mode information (PF_MODE) of 01 in step S1008 to inhibit the hardware prefetch and inserting the software prefetch instruction as necessary.

In order to insert the software prefetch instruction, it is necessary to generate the address of the prefetch target, and in generation of the prefetch address, the indirect access needs the number of instructions and the registers the most and thus largely affects the performance. Then, costs for the software prefetch instruction are large in the order of the stride access and finally the sequential access. By performing the generation processing as illustrated in FIG. 10A and FIG. 10B, it is possible to generate the memory access instruction with the prefetch specifying information in the mode of registering in the prefetch address queue in the priority order of the indirect access, the stride access, and the sequential access.

Note that in the above-described embodiment, the example of the configuration is explained including the two-level hierarchical cache memories of the primary cache unit 20 and the secondary cache unit 30 between the instruction issuing unit and the instruction executing unit 10 and the main memory 60, but this is not restrictive. The embodiments are applicable to a configuration including any number of hierarchical levels of cache memories between the instruction issuing unit and the instruction executing unit 10 and the main memory 60.

It should be noted that ail of the above-described embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

According to an aspect of the embodiments, operation of the hardware prefetch can be controlled flexibly.

All examples and conditional language provided herein are intended, for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
an instruction executing unit that executes a memory access instruction;
a cache memory unit disposed between a memory unit that stores data related to the memory access instruction and the instruction executing unit;
a control information retaining unit that retains control information related to a prefetch to be issued to the cache memory unit, the control information including information related to a prefetch distance that specifies an address of an access destination of a hardware prefetch request with respect to an access address in the memory access instruction;
an address information retaining unit that retains address information based on the memory access instruction executed in the past; and
a control unit that compares address information retained in the address information retaining unit and the access address in the memory access instruction executed, and generates and issues based on a comparison result a hardware prefetch request to the cache memory unit according to the control information of the control information retaining unit specified by specifying information added to the memory access instruction.

2. The processor according to claim 1, wherein the control information retained in the control information retaining unit is rewritable by a software instruction.

3. The processor according to claim 1, wherein the control information retained in the control information retaining unit includes an expectation value of a difference in the access address in the memory access instruction, and
the processor further comprises a retaining control unit that, when the memory access instruction is executed, lets the address information retaining unit retain address information calculated from the access address of the memory access instruction and the expectation value of the difference.

4. The processor according to claim 1, wherein the control information retained in the control information retaining unit includes information related to a prefetch distance that specifies an address of an access destination of a hardware prefetch request with respect to the access address in the memory access instruction.

5. The processor according to claim 1, further comprising a plurality of control information retaining units that retain control information related to a prefetch to be issued to the cache memory unit.

6. The processor according to claim 1, wherein whether to generate the hardware prefetch request to the cache memory unit according to the control information of the control information retaining unit or generate a hardware prefetch request to the cache memory unit according to hardware setting is switchable by the specifying information added to the memory access instruction.

7. The processor according to claim 1, wherein when the hardware prefetch request to the cache memory unit according to the control information of the control information retaining unit is generated, a first mode in which at an opportunity of occurrence of a cache miss, address information is registered in the address information retaining unit, an access pattern is detected, and the hardware prefetch request is generated and a second mode in which the hardware prefetch request is generated simultaneously as a memory access instruction without registering the address information in the address information retaining unit are switchable by the specifying information added to the memory access instruction.

8. The processor according to claim 1, further comprising a setting information retaining unit that retains setting information,
wherein a largest number of entries of the address information retaining unit according to the control information of the control information retaining unit and a largest number of entries of the address information retaining unit according to the setting information set by the setting information retaining unit are switchable according to the setting information retained in the setting information retaining unit.

9. The processor according to claim 1, wherein whether to generate the hardware prefetch request or not is controlled by the specifying information added to the memory access instruction.

10. A control method of a processor, the processor including an instruction executing unit that executes a memory access instruction, and a cache memory unit disposed between a memory unit that stores data related to the memory access instruction and the instruction executing unit, the control method comprising:
comparing address information, based on the memory access instruction executed in the past, retained in an address information retaining unit and an access address in the memory access instruction executed by a control unit of the processor, and
generating and issuing based on a comparison result a hardware prefetch request to the cache memory unit according to the control information, related to a prefetch to be issued to the cache memory unit, retained a control information retaining unit specified by specifying information added to the memory access instruction by the control unit,
the control information includes information related to a prefetch distance that specifies an address of an access destination of the hardware prefetch request with respect to the access address in the memory access instruction.

11. A processor comprising:
an instruction executing unit that executes a memory access instruction;
a cache memory unit disposed between a memory unit that stores data related to the memory access instruction and the instruction executing unit;
a control information retaining unit that retains control information related to a prefetch to be issued to the cache memory unit, the control information including an expectation value of a difference in an access address in the memory access instruction;
an address information retaining unit that retains address information based on the memory access instruction executed in the past;
a retaining control unit that lets the address information retaining unit retain address information calculated from the access address of the memory access instruction and the expectation value of the difference when the memory access instruction is executed; and
a control unit that compares address information retained in the address information retaining unit and the access address in the memory access instruction executed, and generates and issues based on a comparison result a hardware prefetch request to the cache memory unit according to the control information of the control information retaining unit specified by specifying information added to the memory access instruction.

12. The processor according to claim 11, wherein the control information retained in the control information retaining unit is rewritable by a software instruction.

13. The processor according to claim 11, wherein the control information retained in the control information retaining unit includes information related to a prefetch distance that specifies an address of an access destination of a hardware prefetch request with respect to the access address in the memory access instruction.

14. The processor according to claim 11, further comprising a plurality of control information retaining units that retain control information related to a prefetch to be issued to the cache memory unit.

15. The processor according to claim 11, wherein whether to generate the hardware prefetch request to the cache memory unit according to the control information of the control information retaining unit or generate a hardware prefetch request to the cache memory unit according to hardware setting is switchable by the specifying information added to the memory access instruction.

16. The processor according to claim 11, wherein when the hardware prefetch request to the cache memory unit according to the control information of the control information retaining unit is generated, a first mode in which at an opportunity of occurrence of a cache miss, address information is registered in the address information retaining unit, an access pattern is detected, and the hardware prefetch request is generated and a second mode in which the hardware prefetch request is generated simultaneously as a memory access instruction without registering the address information in the address information retaining unit are switchable by the specifying information added to the memory access instruction.

17. The processor according to claim 11, further comprising a setting information retaining unit that retains setting information,
wherein a largest number of entries of the address information retaining unit according to the control information of the control information retaining unit and a largest number of entries of the address information retaining unit according to the setting information set by the setting information retaining unit are switchable according to the setting information retained in the setting information retaining unit.

18. The processor according to claim 11, wherein whether to generate the hardware prefetch request or not is controlled by the specifying information added to the memory access instruction.

19. A control method of a processor, the processor including an instruction executing unit that executes a memory access instruction, and a cache memory unit disposed between a memory unit that stores data related to the memory access instruction and the instruction executing unit, the control method comprising:

comparing address information, based on the memory access instruction executed in the past, retained in an address information retaining unit and an access address in the memory access instruction executed by a control unit of the processor;

controlling, when the memory access instruction is executed, to let the address information retaining unit retain address information calculated from the access address of the memory access instruction and an expectation value of a difference in control information retained a control information retaining unit; and generating and issuing based on a comparison result a hardware prefetch request to the cache memory unit according to the control information, related to a prefetch to be issued to the cache memory unit, retained a control information retaining unit specified by specifying information added to the memory access instruction by the control unit, wherein the control information retained in the control information retaining unit includes the expectation value of the difference in the access address in the memory access instruction.

* * * * *